United States Patent [19]

Köhler et al.

[11] Patent Number: 5,326,851
[45] Date of Patent: Jul. 5, 1994

[54] LOW-VISCOSITY POLYARYLENE SULFIDES

[75] Inventors: Burkhard Köhler; Udo Wolf; Wolfgang Rüsseler, all of Krefeld; Wilfried Haese, Odenthal, all of Fed. Rep. of Germany

[73] Assignee: Bayer AG, Leverkusen

[21] Appl. No.: 977,062

[22] Filed: Nov. 16, 1992

[30] Foreign Application Priority Data

Nov. 27, 1991 [DE] Fed. Rep. of Germany ....... 4138905

[51] Int. Cl.$^5$ .................... C08G 75/14; C08F 283/00
[52] U.S. Cl. ...................................... 528/388; 525/537
[58] Field of Search .................... 528/388; 525/537

[56] References Cited

U.S. PATENT DOCUMENTS

| | | | |
|---|---|---|---|
| 3,919,177 | 11/1975 | Campbell | 528/374 |
| 4,116,947 | 9/1978 | Edmonds, Jr. et al. | 528/388 |
| 4,150,003 | 4/1979 | McClain et al. | 524/272 |
| 4,585,856 | 4/1986 | Ebert et al. | 528/388 |
| 4,631,336 | 12/1986 | Idel et al. | 528/388 |
| 4,760,128 | 7/1988 | Ebert et al. | 528/388 |

FOREIGN PATENT DOCUMENTS 59-221331 12/1984 Japan.

*Primary Examiner*—John C. Bleutge
*Assistant Examiner*—Helen F. Lee
*Attorney, Agent, or Firm*—Connolly & Hutz

[57] ABSTRACT

The invention relates to low-viscosity polyarylene sulfides (PAS), preferably polyphenylene sulfides (PPS), which are produced with cycloaliphatic, unsaturated acids as molecular weight regulators.

13 Claims, No Drawings

LOW-VISCOSITY POLYARYLENE SULFIDES

This invention relates to low-viscosity polyarylene sulfides (PAS), preferably polyphenylene sulfides (PPS), which are produced with cycloaliphatic, unsaturated acids as molecular weight regulators.

PPS is produced, for example, from p-dichlorobenzene and sodium sulfide, the p-dichlorobenzene being used in equimolar quantities or in a slight excess. Accordingly, low molecular weight polyphenylene sulfides (PPS) generally have a higher chlorine content than high molecular weight polyarylene sulfides.

PPS of low molecular weight and, hence, relatively low viscosity is suitable, for example, for the encapsulation of electronic components. The tendentially higher chlorine content of low viscosity PPS is undesirable in this particular application because HCl can be eliminated on exposure to heat.

Accordingly, it is desirable to combine the good flow properties of low viscosity PPS with the low chlorine content of high-viscosity PPS types. One way of achieving this objective is the selective use of chain terminators in the production process. Monochlorine compounds or monothiols are generally used as chain terminators.

It has been found that polyphenylene sulfides of relatively low molecular weight and low chlorine content can be obtained by addition of cycloaliphatic unsaturated acids to the reaction mixture in the synthesis of PPS.

Accordingly, the present invention relates to polyarylene sulfides, preferably polyphenylene sulfide, obtainable by reaction of aromatic dihalogen compounds, optionally in the presence of small quantities of aromatic trihalogen or polyhalogen compounds with—based on aromatic dihalogen compounds—98 to 120 mol-% alkali metal sulfides and/or hydrogen sulfides, the ratio of sulfides to hydrogen sulfides being between 100:0 and 60:40, in dipolar aprotic solvents, preferably N-methyl caprolactam or N-methyl pyrrolidone, in the presence of—based on aromatic dichlorine compounds—0.1 to 10 mol-% cycloaliphatic unsaturated acids or alkali metal salts thereof.

Examples of aromatic dihalogen compounds are p-dichlorobenzene, m-dichlorobenzene, 4,4'-dichlorobiphenyl, 4,4'-dichlorodiphenyl sulfone, 4,4'-dichlorobenzophenone, 1,5-dichloronaphthalene.

Examples of aromatic trihalogen or polyhalogen compounds are 1,2,4-trichlorobenzene, 2,4,4'-trichlorodiphenyl sulfone, 1,3,5-tris-(4-chlorophenyl)-benzene, 1,2,4,5-tetrachlorobenzene.

Cycloaliphatic acids in the context of the invention are acids which contain aliphatic rings with exocyclic or endocyclic double bonds, but are not aromatic; for example cycloaliphatic unsaturated acids, such as tetrahydrophthalic acid, abietic acid, tetrahydrophthalic acids (3 isomers).

Instead of abietic acid, it is possible to use colophony which contains more than 50% by weight abietic acid.

The polyarylene sulfides according to the invention are preferably produced by the processes according to EP-A 171 021 or U.S. Pat. No. 3,354,129.

The polyarylene sulfides according to the invention are distinguished by low viscosity and a low chlorine content. They may be used for the production of molded articles, for example electronic components.

EXAMPLES

Comparison Example

A melt of 6.44 mol sodium sulfide, 2.76 mol sodium hydrogen sulfide and 900 g water and 4 mol molten p-dichlorobenzene are added dropwise over a period of 4 h at 215° C. to a mixture of 2.5 l N-methyl caprolactam and 4 mol p-dichlorobenzene. Water distills off. After the addition, the reaction mixture is heated for 9 h to 240° C. and the polymer is isolated by precipitation and washing with isopropanol and water. A polyphenylene sulfide having a viscosity of 269 Pas (310° C., 1000 1/s) and a chlorine content of 0.22% is obtained.

EXAMPLE 1

The procedure is as described in the Comparison Example, except that 25 g abietic acid (Aldrich) and 3.25 g sodium hydroxide are also initially introduced. A polyphenylene sulfide having a viscosity of 16 Pas and a chlorine content of 0.18% is obtained.

We claim:

1. Polyarylene sulfides obtained by reaction of aromatic dihalogen compounds with—based on aromatic dihalogen compounds—98 to 120 mol-% alkali metal sulfides and/or hydrogen sulfides, the ratio of sulfides to hydrogen sulfides being between 100:0 and 60:40, in dipolar aprotic solvents in the presence of—based on aromatic dichlorine compounds—0.1 to 10 mol-% cycloaliphatic unsaturated acids comprising at least 50% by weight abietic acid.

2. Polyarylene sulfides as claimed in claim 1, wherein said reaction takes place in the presence of small quantities of aromatic trihalogen or polyhalogen compounds.

3. Polyarylene sulfides as claimed in claim 1, wherein said aromatic dihalogen compounds are selected from the group consisting of p-dichlorobenzene, m-dichlorobenzene, 4,4'-dichlorobiphenyl, 4,4'-dichlorodiphenyl sulfone, 4,4'-dichlorobenzophenone and 1,5-dichloronaphthalene.

4. Polyarylene sulfides as claimed in claim 2, wherein said aromatic trihalogen or polyhalogen compounds are selected from the group consisting of 1,2,4-trichlorobenzene, 2,4,4'-trichlorodiphenyl sulfone, 1,3,5-tris-(4-chlorophenyl)-benzene and 1,2,4,5-tetrachlorobenzene.

5. Polyarylene sulfides as claimed in claim 1, wherein said cycloaliphatic unsaturated acid is commercially pure abietic acid.

6. Polyarylene sulfides as claimed in claim 1, wherein said cycloaliphatic unsaturated acid is colophony which contains more than 50% by weight abietic acid.

7. Polyarylene sulfides as claimed in claim 1, wherein said polyarylene sulfides have a viscosity of about 16 Pas.

8. Polyarylene sulfides as claimed in claim 1, wherein said polyarylene sulfides have a chloride content of about 0.18%.

9. Polyarylene sulfides obtained by reaction of aromatic dihalogen compounds with—based on aromatic dihalogen compounds—98 to 120 mol-% alkali metal sulfides and/or hydrogen sulfides, the ratio of sulfides to hydrogen sulfides being between 100:0 and 60:40, in dipolar aprotic solvents in the presence of—based on aromatic dichlorine compounds—0.1 to 10 mol-% alkali metal salts of cycloaliphatic unsaturated acids comprising at least 50% by weight abietic acid.

10. Polyarylene sulfides as claimed in claim 9, wherein said alkali metal salts of said cycloaliphatic unsaturated acids are selected from alkali metal salts of cycloaliphatic unsaturated acids selected from the group consisting of commercially pure abietic acid and colophony which contains more than 50% by weight abietic acid.

11. Polyarylene sulfides as claimed in claim 10, wherein said alkali metal salts of cycloaliphatic unsaturated acids are alkali metal salts of commercially pure abietic acid.

12. Polyarylene sulfides as claimed in claim 9, wherein said reaction takes place in the presence of small quantities of aromatic trihalogen or polyhalogen compounds.

13. Polyarylene sulfides as claimed in claim 12, wherein said aromatic trihalogen or polyhalogen compounds are selected from the group consisting of 1,2,4-trichlorobenzene, 2,4,4'-trichlorodiphenyl sulfone, 1,3,5-tris-(4-chlorophenyl)-benzene and 1,2,4,5-tetrachlorobenzene.

* * * * *